US009694376B2

(12) United States Patent
Böhm et al.

(10) Patent No.: US 9,694,376 B2
(45) Date of Patent: Jul. 4, 2017

(54) CYLINDER-AND-PISTON ASSEMBLY FOR A BOTTLE ATTACHMENT APPARATUS

(71) Applicant: BRAND GMBH + CO KG, Wertheim (DE)

(72) Inventors: Dieter Böhm, Wertheim (DE); Günter Hochholzer, Werbach (DE); Ottmar Kneucker, Helmstadt (DE); Markus Kurz, Wertheim (DE)

(73) Assignee: BRAND GMBH + CO KG, Wertheim (DE)

( * ) Notice: Subject to any disclaimer, the term of this patent is extended or adjusted under 35 U.S.C. 154(b) by 50 days.

(21) Appl. No.: 15/002,841

(22) Filed: Jan. 21, 2016

(65) Prior Publication Data
US 2016/0214127 A1 Jul. 28, 2016

(30) Foreign Application Priority Data

Jan. 23, 2015 (DE) .................... 20 2015 000 522 U

(51) Int. Cl.
*G01F 11/00* (2006.01)
*B05B 11/00* (2006.01)
(Continued)

(52) U.S. Cl.
CPC ........ *B05B 11/3007* (2013.01); *B01L 3/0206* (2013.01); *B05B 11/3047* (2013.01);
(Continued)

(58) Field of Classification Search
CPC ............. B05B 11/3007; B05B 11/3047; B01L 3/0206; B01L 2300/043; B01L 2400/0616;
(Continued)

(56) References Cited

U.S. PATENT DOCUMENTS 3,729,022 A 4/1973 Roach
3,940,027 A 2/1976 Marterer
(Continued)

FOREIGN PATENT DOCUMENTS

DE 1 632 032 A1 8/1970
DE 36 07 139 A1 9/1987
(Continued)

OTHER PUBLICATIONS

Brand General Catalog 900 (Jun. 2013), pp. 334-341.

*Primary Examiner* — Frederick C Nicolas
(74) *Attorney, Agent, or Firm* — David S. Safran

(57) ABSTRACT

A cylinder-and-piston assembly for a bottle attachment apparatus for handling liquids provides a cylinder attachable to a valve block assembly, a piston, displaceable in a sealed manner in the longitudinal direction within the cylinder, and a cylinder housing connected to the piston and externally encompassing the cylinder. The piston is displaceable in the cylinder and the stroke length of the piston in the cylinder is delimited by a fixed stop, which interacts with a stroke length stop on the cylinder housing. The cylinder housing has a longitudinal slot running in the longitudinal direction and on the external side thereof has a scale assigned to this longitudinal slot. The stroke length stop on the cylinder housing is adjustable in the longitudinal direction and is interlockable in the respective position.

21 Claims, 6 Drawing Sheets

(51) Int. Cl.
 *G01F 11/02* (2006.01)
 *B01L 3/02* (2006.01)
 *B67D 1/08* (2006.01)
 *B65D 25/56* (2006.01)

(52) U.S. Cl.
 CPC ....... *G01F 11/028* (2013.01); *B01L 2300/043* (2013.01); *B01L 2400/0616* (2013.01); *B01L 2400/0644* (2013.01); *B05B 11/3005* (2013.01); *B65D 25/56* (2013.01); *B67D 1/0871* (2013.01)

(58) Field of Classification Search
 CPC .......... B01L 2400/0644; G01F 11/028; B65D 25/56; B67D 1/0871
 See application file for complete search history.

(56) References Cited

U.S. PATENT DOCUMENTS

| | | |
|---|---|---|
| 4,074,831 A | 2/1978 | Roach |
| 4,273,257 A | 6/1981 | Smith et al. |
| 4,306,670 A | 12/1981 | Oshikubo |
| 4,526,294 A | 7/1985 | Hirschmann et al. |
| 5,862,958 A | 1/1999 | Edwards et al. |
| 6,135,325 A | 10/2000 | Fessel et al. |
| 8,142,738 B2 * | 3/2012 | Boehm ................ B01L 3/0206 422/501 |
| 8,597,593 B2 * | 12/2013 | Boehm ................ B01L 3/0206 422/501 |
| 8,668,117 B2 * | 3/2014 | Crossdale ........... B05B 11/0056 222/153.13 |
| 8,973,847 B2 * | 3/2015 | Iammatteo .......... B05B 11/3018 222/340 |
| 9,352,949 B2 * | 5/2016 | Rege .................... B67D 1/0418 |
| 2010/0021349 A1 | 1/2010 | Boehm et al. |
| 2011/0127298 A1 | 6/2011 | Shah |
| 2015/0114997 A1 | 4/2015 | Uldry et al. |
| 2016/0068380 A1 * | 3/2016 | Rege .................... B67D 1/0808 222/23 |
| 2016/0214127 A1 | 7/2016 | Böhm et al. |
| 2016/0214846 A1 | 7/2016 | Hochholzer et al. |
| 2016/0214847 A1 | 7/2016 | Böhm et al. |
| 2016/0214848 A1 | 7/2016 | Böhm et al. |
| 2016/0264391 A1 | 9/2016 | Hochholzer et al. |

FOREIGN PATENT DOCUMENTS

| | | |
|---|---|---|
| DE | 198 00 709 A1 | 7/1999 |
| DE | 20 2009 012 054 U1 | 3/2011 |
| EP | 0 542 241 A2 | 5/1993 |
| EP | 1 236 976 A1 | 9/2002 |

* cited by examiner

CYLINDER-AND-PISTON ASSEMBLY FOR A BOTTLE ATTACHMENT APPARATUS

BACKGROUND OF THE INVENTION

Field of the Invention

The invention relates to a cylinder-and-piston assembly for a bottle attachment apparatus for handling liquids, and to a bottle attachment apparatus for handling liquids.

Description of Related Art

In the case of bottle attachment apparatuses for handling liquids, the focus is on precisely measuring and conveying liquids from a storage bottle or another storage container, wherein precise measuring is performed when a partial volume of liquid is received from the storage bottle or similar into the apparatus and/or when a partial volume of liquid is externally dispensed from the apparatus into a container.

Bottle attachment apparatus of the type being discussed are in particular bottle attachment dispensers and burettes. Bottle attachment apparatuses of this type are widely used in chemical, biological, and pharmaceutical laboratories and production facilities.

The term "liquid" in the present context preferably refers to liquids as are used in chemical, biological, and pharmaceutical laboratories and production facilities etc. These are preferably liquids having a relative viscosity of up to about 300 (viscosity relative to the viscosity of water, measured at normal conditions). In colloquial terms, the liquids are thus preferably those in the range of very low viscosity to slightly viscous.

In the case of bottle attachment apparatuses of the type being discussed, high requirements are set for volume accuracy of liquid intake and/or liquid dispensation, and for operator safety. The bottle attachment apparatuses are usually operated manually or else are driven by an actuator.

A typical example of a bottle attachment apparatus in the form of a bottle top dispenser is known from European Patent Application EP 0 542 241 A2. The present invention proceeds from this prior art. For bottle attachment apparatuses in the form of bottle top dispensers, reference is made to the entire content of European Patent Application EP 0 542 241 A2.

In an exemplary manner, a bottle attachment apparatus in the form of a buret is known from European Patent Application EP 2 799 141 A2 and corresponding U.S. Pat. No. 8,142,738 B2. A bottle attachment apparatus in the form of burette has many construction details in common with a bottle attachment apparatus in the form of a bottle top dispenser. Also to this extent, reference is made to the entire content of European Patent Application EP 2 799 141 A2 and corresponding U.S. Pat. No. 8,142,738 B2.

Here and hereunder, a bottle attachment apparatus is always described in the operating position thereof, that is to say in the position thereof when fastened to a storage bottle or similar, and when aligned in a substantially vertical manner. A valve block assembly for such a bottle attachment apparatus is also described in a corresponding manner, that is to say likewise in the operating position thereof, that is to say when installed in a bottle attachment apparatus in the operating position thereof.

A substantial component part of a bottle attachment apparatus of the type being discussed is the cylinder-and-piston assembly with the aid of which the liquid may be suctioned and exhausted again. Said cylinder-and-piston assembly has a cylinder which defines a longitudinal direction, and a piston which is guided in a sealed manner in the cylinder so as to be longitudinally displaceable. In the event of an upward movement of the piston in the cylinder, the liquid is suctioned by forming negative pressure in the cylinder. In the event of a downward movement, the liquid in the cylinder is exhausted again from the cylinder. The flow of the liquid during suctioning, on the one hand, and during exhausting, on the other hand, is directed by valves of the valve block assembly. The cylinder-and-piston assembly is connected in a sealing manner to the valve block assembly and to the lines which are located therein. The valve block assembly as such in turn is attached onto the storage bottle or similar with the aid of a fastening assembly.

An intake valve which allows liquid to be suctioned from the storage bottle by means of an intake pipe is located in the valve block of the valve block assembly. The intake pipe, most often in the form of a plug-fitted tube, extends deeply downward into the storage bottle. An exhaust line extends away from the valve block in an approximately horizontal manner. An exhaust valve sits in the exhaust line or in the valve block, so as to be at the beginning of the exhaust line. In some instances, the exhaust line has an additional switching valve by way of which a return flow line leading back into the storage bottle may be opened or closed. At the opening from which the liquid exits, the exhaust line may have a closure.

Since the exhaust line protrudes from the valve block in an approximately horizontal manner and the previously discussed switching valve also often sits there, this is that side from which an operator works on the bottle attachment apparatus. This side may be referred to as the "front side" of the bottle attachment apparatus. The opposite side is the "rear side" of the bottle attachment apparatus. In the case of an electronic design embodiment of a bottle attachment apparatus, a display having corresponding operating elements is preferably located on the front side of the bottle attachment apparatus.

The fastening assembly for fastening the external housing and/or the valve block assembly of the bottle attachment apparatus onto a storage bottle or similar is often a thread assembly which is similar to a union nut, or is an internal thread which is incorporated into the valve block per se, for screwing onto the external thread on a bottleneck of the storage bottle (see the prior art mentioned at the outset). However, in principle other fastening assemblies, such as bayonet systems or short-stroke collets are likewise employable, as are systems of the type of a taper-ground joint, which are usual in laboratories.

The present focus is on the cylinder-and-piston assembly for a bottle attachment apparatus of the type being discussed, and in particular on the stroke length adjustment on the cylinder housing of the cylinder-and-piston assembly.

In the prior art (European Patent Application EP 0 542 241 A2) from which the invention proceeds the cylinder-and-piston assembly has a cylinder housing which is connected to the piston and externally encompasses the cylinder by way of an internal side which faces the cylinder and of an external side which faces away from the cylinder. By displacing the cylinder housing up or down in relation to the cylinder, the piston is displaced in a corresponding manner in the cylinder. The stroke length of the piston in the cylinder is delimited by a fixed stop which interacts with a stroke length stop on the cylinder housing. On account thereof, it is also prevented that the piston may be upwardly extracted from the cylinder.

The cylinder, by way of the central axis thereof, defines a longitudinal direction. The cylinder housing has a longitudinal slot running in the longitudinal direction. A scale which is assigned to the longitudinal slot is located on the external side of the cylinder housing, in most cases on one side next to the longitudinal slot. The scale allows the volume of liquid in the cylinder, which has in each case been set by the cylinder-and-piston assembly, to be identified.

In order for various volumes to be able to be suctioned and exhausted by way of the cylinder-and-piston assembly, the stroke length stop on the cylinder housing is adjustable in the longitudinal direction. The stroke length stop is interlockable in the respectively set position and then defines the stroke length and thus also the volume which has been made available to the liquid in the cylinder.

In the prior art from which the invention proceeds, the stroke length stop has an indicator element which for indicating a specific value on the scale interacts with the scale, an interlocking mount, and a handle. The interlocking mount has a lateral and short row of teeth. An elongate row of teeth on the cylinder housing at the periphery of the longitudinal slot communicates with the row of teeth on the interlocking mount. The two rows of teeth together form a tooth assembly. If an when the rows of teeth are mutually engaged, the interlocking mount is interlocked in the longitudinal direction with the indicator element on the cylinder housing. The engagement of the tooth assembly is maintained by spring force. By actuating the handle counter to the spring force, the rows of teeth of the tooth assembly may be mutually disengaged. If and when the handle is further held in the release position, the handle together with the interlocking mount and the indicator element may be displaced up and down in the longitudinal slot of the cylinder housing until the desired position has been reached. If and when the handle is let go, the stroke length stop is interlocked in this position by the tooth assembly.

A stroke length stop on a cylinder housing of a cylinder-and-piston assembly for a bottle attachment apparatus of the type being discussed, which has an indicator element, an interlocking mount, and an interlocking cap, and which by way of a friction-engagement assembly is interlockable in the respective position on the internal side of the cylinder housing is known from other prior art (German Patent Application DE 23 43 687 A1).

In the case of all cylinder-and-piston assemblies known from the prior art the stroke length stop is loosened so as to be able to adjust the latter in the longitudinal direction on the cylinder housing. The loosened stroke length stop is then also laterally not aligned as well in the longitudinal slot as is the case with the interlocked stroke length stop. The indicator element is somewhat raised above the external side of the cylinder housing. On account thereof, in some instances a certain parallax effect which impedes the selection of the correct and desired volume with the aid of the indicator element and of the scale results. This is the case in some instances in particular with a stroke length stop with a tooth assembly, because the stroke length stop here has to be loosened to a comparatively large extent, so as to disengage the rows of teeth of the tooth assembly for adjusting the stroke length stop.

If and when a handle or an interlocking cap is excessively loosened, the interlocking mount and/or the indicator element are/is disengaged from the peripheries of the longitudinal slot, and prior to interlocking the stroke length stop on the cylinder housing again, the interlocking mount and/or the indicator element have/has to first be rethreaded into the longitudinal slot. Moreover, an excessively loosened interlocking mount in the interior strikes the cylinder and/or tilts together with the indicator element in the longitudinal slot. Both issues are obstacles to adjusting the stroke length stop in the longitudinal slot.

Overall, the known cylinder-and-piston assembly having the stroke length stop in terms of operation is in need of improvement. The teaching is therefore based on the issue of improving a cylinder-and-piston assembly for a bottle attachment apparatus for handling liquids in terms of handling of the stroke length stop in practical use.

SUMMARY OF THE INVENTION

The present invention is directed to a cylinder-and-piston assembly for a bottle attachment apparatus for handling liquids, wherein the bottle attachment apparatus has a cylinder-and-piston assembly for suctioning and exhausting liquid, a valve block assembly, optionally an external housing receiving the valve block assembly, and a fastening assembly for fastening the external housing and/or the valve block assembly on a storage bottle or the like, wherein the cylinder-and-piston assembly has a cylinder which is attachable to the valve block assembly and by way of its central axis defines a longitudinal direction, a piston which is displaceable in a sealed manner in the longitudinal direction in the cylinder, and a cylinder housing which is connected to the piston and externally encompasses the cylinder by way of an internal side which faces the cylinder and of an external side which faces away from the cylinder, wherein the piston is displaceable in the cylinder by displacing the cylinder housing, and wherein the stroke length of the piston in the cylinder is delimited by a fixed stop which interacts with a stroke length stop on the cylinder housing and is disposed on the cylinder, wherein the cylinder housing has a longitudinal slot running in the longitudinal direction, and on the external side has a scale assigned to the longitudinal slot, wherein the stroke length stop on the cylinder housing is adjustable in the longitudinal direction and is interlockable in the respective position, wherein the stroke length stop has an indicator element which for indicating a specific value on the scale interacts with the scale, an interlocking mount, and an interlocking cap, wherein the interlocking mount is displaceably disposed in the longitudinal slot and has a counter bearing arranged on the internal side of the cylinder housing, which is tensionable in relation to the internal side of the cylinder housing, and a threaded bolt which extends from the counter bearing through the longitudinal slot to the external side of the cylinder housing, wherein the indicator element has an indicator support which is disposed on the external side of the cylinder housing, an appendage which extends from the indicator support through the longitudinal slot to the internal side of the cylinder housing, and a locking mechanism which is disposed on the appendage and which prevents extraction of the appendage from the longitudinal slot, wherein the interlocking mount and/or the indicator element are/is guided on the cylinder housing so as to be displaceable in the longitudinal direction but so as to be rotationally fixed, wherein the interlocking cap is screwed onto the threaded bolt of the interlocking mount by way of a counter thread, wherein the indicator support of the indicator element is disposed between the interlocking cap and the external side of the cylinder housing, and wherein the interlocking mount and the indicator element by tightening the interlocking cap on the interlocking mount are interlockable in a desired position on the cylinder housing.

According to the invention, the stroke length stop has an indicator element which for indicating a specific value on the scale interacts with the scale, an interlocking mount, and an interlocking cap. In a manner known per se, the interlocking mount is displaceably disposed in the longitudinal slot. Said interlocking mount has a counter bearing arranged on the internal side of the cylinder housing, which is tensionable in relation to the internal side of the cylinder housing, and a threaded bolt which extends from the counter bearing through the longitudinal slot to the external side of the cylinder housing. The indicator element has an indicator support which is disposed on the external side of the cylinder housing, an appendage which extends from the indicator support through the longitudinal slot to the internal side of the cylinder housing, and a locking mechanism which is disposed on the appendage. The locking mechanism prevents extracton of the appendge from the longitudinal slot in the direction of the longitudinal axis of the appendage.

The interlocking cap is screwed onto the threaded bolt of the interlocking mount by way of a counter thread. The indicator support of the indicator element is disposed between the interlocking cap and the external side of the cylinder housing. The interlocking mount, as well as the indicator element, are interlockable in a desired position by tightening the interlocking cap on the interlocking mount. The interlocking cap which is screwed onto the interlocking mount is interlocked with the cylinder housing in the same way.

The interlocking mount and/or the indicator element are/is guided on the cylinder housing so as to be displaceable in the longitudinal direction but so as to be rotationally fixed. This may be implemented in a direct or indirect manner by the side walls of the longitudinal slot in the cylinder housing, or in any other manner. It is moreover ensured by the invention that the indicator element is captively attached to the cylinder housing. Extraction of the appendage of the indicator element is prevented by the locking mechanism. Rotationally fixed guiding in the longitudinal direction is thus engaged also in the case of a loosened interlocking cap.

On account of the indicator element being guided in a rotationally fixed manner in relation to the cylinder housing, be it in a direct or indirect manner, the indicator support of the indicator element always has the correct position, such that errors during setting of the stroke length stop, which are caused by parallax effects, are minimized.

According to one preferred design, rotationally fixed guiding is initially achieved in that the appendage of the indicator element together with the peripheries of the longitudinal slot, and optionally and additionally also together with the locking mechanism, form a guide for displacement in the longitudinal slot.

Locking of the indicator element on the cylinder housing may be implemented by various types of construction. The locking mechanism on the indicator element being embodied as a preferably spring-loaded hook structure is particularly preferably a latch-type lock. The latter may extend to the internal side of the cylinder housing, so as to be located laterally of the longitudinal slot.

According to a separate, independent aspect of the invention there is provided a cylinder-and-piston assembly for a bottle attachment apparatus for handling liquids, wherein the bottle attachment apparatus has a cylinder-and-piston assembly for suctioning and exhausting liquid, a valve block assembly, optionally an external housing receiving the valve block assembly, and a fastening assembly for fastening the external housing and/or the valve block assembly on a storage bottle or the like, wherein the cylinder-and-piston assembly has a cylinder which is attachable to the valve block assembly and by way of its central axis defines a longitudinal direction, a piston which is displaceable in a sealed manner in the longitudinal direction in the cylinder, and a cylinder housing which is connected to the piston and externally encompasses the cylinder by way of an internal side which faces the cylinder and of an external side which faces away from the cylinder, wherein the piston is displaceable in the cylinder by displacing the cylinder housing, and wherein the stroke length of the piston in the cylinder is delimited by a fixed stop which interacts with a stroke length stop on the cylinder housing and is disposed on the cylinder, wherein the cylinder housing has a longitudinal slot running in the longitudinal direction, and on the external side has a scale assigned to the longitudinal slot, wherein the stroke length stop on the cylinder housing is adjustable in the longitudinal direction and is interlockable in the respective position, wherein the stroke length stop has an indicator element which for indicating a specific value on the scale interacts with the scale, an interlocking mount, and an interlocking cap, wherein the interlocking mount is displaceably disposed in the longitudinal slot and has a counter bearing arranged on the internal side of the cylinder housing, which is tensionable in relation to the internal side of the cylinder housing, and a threaded bolt which extends from the counter bearing through the longitudinal slot to the external side of the cylinder housing, wherein the interlocking mount and/or the indicator element are/is guided on the cylinder housing so as to be displaceable in the longitudinal direction but so as to be rotationally fixed, wherein the interlocking cap is screwed onto the threaded bolt of the interlocking mount by way of a counter thread, wherein the indicator support of the indicator element is disposed between the interlocking cap and the external side of the cylinder housing, wherein the interlocking mount and the indicator element by tightening the interlocking cap on the interlocking mount are interlockable in a desired position on the cylinder housing, and wherein the interlocking mount on the external side of the cylinder housing has a return stop which delimits reverse displacement of the counter bearing in the direction of the internal side of the cylinder housing.

The cylinder sits in the interior, inside the cylinder housing, and is optionally protected by a splinter shield casing. The stroke length stop and the component parts thereof should not impede the movement of the cylinder housing when the latter is moved up and down. It is therefore recommended according to a teaching which optionally may be an independent teaching, that the interlocking mount on the threaded bolt on the external side of the cylinder housing has a return stop which delimits reverse displacement of the threaded bolt and thus of the counter bearing in the direction of the internal side of the cylinder housing. The return stop is preferably embodied as a latching hook structure. This structure is easy to manufacture and assemble.

As has already been explained in the context of the prior art, it also applies to the teaching of the present invention that a friction engagement assembly or a tooth assembly may be implemented for interlocking the stroke length stop in the respective position. Both systems have various advantages and are employed as mutual alternatives.

The threaded bolt of the interlocking mount and thus also the counter bearing of the interlocking mount, which lies within the cylinder housing, may only be displaced toward the inside into the cylinder housing by a limited length; thereafter the return stop takes effect. The length corresponds to the clear spacing between the external side of the cylinder housing and the return stop, and to at least the dimension which is present in the guide between the locking mechanism and the cylinder housing as clearance for movement of the indicator element in the longitudinal slot. In the case of interlocking by way of a tooth assembly, the height of the latter is added thereto. When the interlocking cap is loosened the return stop stops the adjusting movement of the counter bearing. In this way, friction or tilting on the cylinder or on the splinter shield casing of the cylinder, respectively, may be systematically avoided.

As has already been explained, the anti-rotation device of the interlocking mount and/or of the indicator element may be implemented by way of interaction with the internal peripheries of the longitudinal slot of the cylinder housing, which runs in the longitudinal direction. This is effected in this way in the prior art. However, it may also be provided alternatively or additionally thereto that an anti-rotation molding is provided on the interlocking mount, and that an anti-rotation receptacle which extends in the longitudinal direction and in which the anti-rotation molding is guided so as to be displaceable in the longitudinal direction but so as to be rotationally fixed, is provided on the internal side of the cylinder housing. In a kinematically reversed arrangement, it may likewise be provided that an anti-rotation molding which extends in the longitudinal direction is provided on the internal side of the cylinder housing, that an anti-rotation receptacle is provided on the interlocking mount, and that the anti-rotation receptacle is guided on the anti-rotation molding so as to be displaceable in the longitudinal direction but so as to be rotationally fixed.

In substance, the focus here is on a discrete anti-rotation device connection between the interlocking mount and the cylinder housing, preferably of the type of a groove-and-tongue connection which extends in the longitudinal direction.

In particular, a double anti-rotation device by way of such an anti-rotation molding/anti-rotation receptacle and by way of the collaboration of the peripheries of the longitudinal slot, which run in the longitudinal direction in the cylinder housing, in practice leads to particularly useful and secure guiding of displacement in the longitudinal direction while simultaneously maintaining an anti-rotation function of the stroke length stop on the cylinder housing.

A particularly expedient solution in terms of construction leads to the threaded bolt of the interlocking mount penetrating the indicator support and preferably also the appendage of the indicator element, wherein, preferably, the indicator element and the interlocking mount are interconnected so as to be displaceable in relation to one another in the direction of the longitudinal axis of the threaded bolt but so as to be rotationally fixed. The appendage of the indicator element thus is located so as to be radially outside. Said appendage may directly implement an anti-rotation device by way of the internal peripheries of the longitudinal slot. The threaded bolt of the interlocking mount is located inside and penetrates the appendage of the indicator element. At this point the threaded bolt of the interlocking mount has no thread but is embodied as a polygonal bolt. Said polygonal bolt may thus sit in a corresponding polygonal seat in the appendage of the indicator element so as to be rotationally fixed but nevertheless so as to also be displaceable in the direction of the longitudinal axis of the threaded bolt.

As is the case for the prior art stroke length stop, the stroke length stop according to the invention interacts with a fixed stop on the cylinder. According to a particularly preferred teaching, it is recommend that the indicator element on the internal side of the cylinder housing has a stop face which impacts on the fixed stop, wherein, preferably, the stop face is of round shape, so as to compensate for a slight inclination of the indicator element.

According to a further and optionally independent teaching of the invention there is provided a cylinder-and-piston assembly for a bottle attachment apparatus for handling liquids, wherein the bottle attachment apparatus has a cylinder-and-piston assembly for suctioning and exhausting liquid, a valve block assembly, optionally an external housing receiving the valve block assembly, and a fastening assembly for fastening the external housing and/or the valve block assembly on a storage bottle or the like, wherein the cylinder-and-piston assembly has a cylinder which is attachable to the valve block assembly and by way of its central axis defines a longitudinal direction, a piston which is displaceable in a sealed manner in the longitudinal direction in the cylinder, and a cylinder housing which is connected to the piston and externally encompasses the cylinder by way of an internal side which faces the cylinder and of an external side which faces away from the cylinder, wherein the piston is displaceable in the cylinder by displacing the cylinder housing, and wherein the stroke length of the piston in the cylinder is delimited by a fixed stop which interacts with a stroke length stop on the cylinder housing and is disposed on the cylinder, wherein the cylinder housing has a longitudinal slot running in the longitudinal direction, and on the external side has a scale assigned to the longitudinal slot, wherein the stroke length stop on the cylinder housing is adjustable in the longitudinal direction and is interlockable in the respective position, wherein the stroke length stop has an indicator element which for indicating a specific value on the scale interacts with the scale, an interlocking mount, and an interlocking cap, wherein the interlocking mount is displaceably disposed in the longitudinal slot and has a counter bearing arranged on the internal side of the cylinder housing, which is tensionable in relation to the internal side of the cylinder housing, and a threaded bolt which extends from the counter bearing through the longitudinal slot to the external side of the cylinder housing, wherein the interlocking mount and/or the indicator element are/is guided on the cylinder housing so as to be displaceable in the longitudinal direction but so as to be rotationally fixed, wherein the interlocking cap is screwed onto the threaded bolt of the interlocking mount by way of a counter thread, wherein the indicator support of the indicator element is disposed between the interlocking cap and the external side of the cylinder housing, wherein the interlocking mount and the indicator element by tightening the interlocking cap on the interlocking mount are interlockable in a desired position on the cylinder housing, and wherein the interlocking cap is linked to the indicator element by way of a connection which is effective in the direction of the longitudinal axis of the appendage of the indicator element, wherein the connection permits rotation of the interlocking cap in relation to the indicator element. In particular, it is recommended here that the connection is embodied as an annular latching connection, wherein, preferably, the interlocking cap in a linking manner encompasses the indicator element on an elevated molded peripheral structure. The connection is preferably releasable when the interlocking cap is completely unscrewed, wherein, furthermore preferably, the required torque to be applied to the interlocking cap for releasing the connection between the interlocking cap and the indicator element is higher than the torque otherwise required for rotating the interlocking cap in relation to the indicator element.

On account thereof, the interlocking cap and the indicator element are capable of being collectively handled as such, but may also be separated if necessary. In particular, the advantage results here that this separation is automatically performed when the interlocking cap is completely released.

By way of the afore-described construction, the interlocking cap which by way of the counter thread thereof is screwed onto the threaded bolt of the interlocking mount, sits on the indicator element so as to be linked in the direction of the longitudinal axis of the appendage of the indicator element. The two components are thus interconnected in the direction of the longitudinal axis of the indicator element. Rotation of the interlocking cap in relation to the indicator element is nevertheless possible. On account thereof, it is ensured that during rotation of the interlocking cap the interlocking mount caused by the thread is indeed displaced in relation to the interlocking cap in the direction of the longitudinal axis of the threaded bolt, but that the interlocking cap and the indicator element remain fixedly interconnected in this direction. Since the indicator element, on account of the locking mechanism, is linked to the cylinder housing, the assembly composed of the interlocking cap and the indicator element maintains its position on the cylinder housing even if the stroke length stop is loosened.

The connection between the interlocking cap and the indicator element may be designed so as to be permanent. However, it is preferable for this connection to be releasable by further unscrewing the interlocking cap. This may be implemented by means of a type of a latching connection, for example, the latter however being shaped so as to be releasable. In this way, the advantage is simultaneously achieved that the torque required for releasing the connection is higher than the torque required for normal operation of the interlocking cap. While unscrewing the interlocking cap, an operator will thus perceive that it is no longer normal loosening of the stroke length stop that is being performed, but that the operator is starting to disassemble the stroke length stop by starting to completely unscrew the interlocking cap. An operator will at the latest at this point refrain from further actuation. It is thus prevented in this manner that the stroke length stop is inadvertently completely released when the interlocking cap is loosened.

The subject matter of the invention is not only the afore-described cylinder-and-piston assembly for a bottle attachment apparatus for handling liquids, but also and in particular a bottle attachment apparatus for handling liquids, the cylinder-and-piston assembly of which is designed in the manner discussed above. Further claims are related to the bottle attachment apparatus incorporating the interesting features.

The invention will be explained in more detail in the following by means of a drawing which merely illustrates a preferred exemplary embodiment. In the drawing:

DETAILED DESCRIPTION OF THE INVENTION

Figure 1:
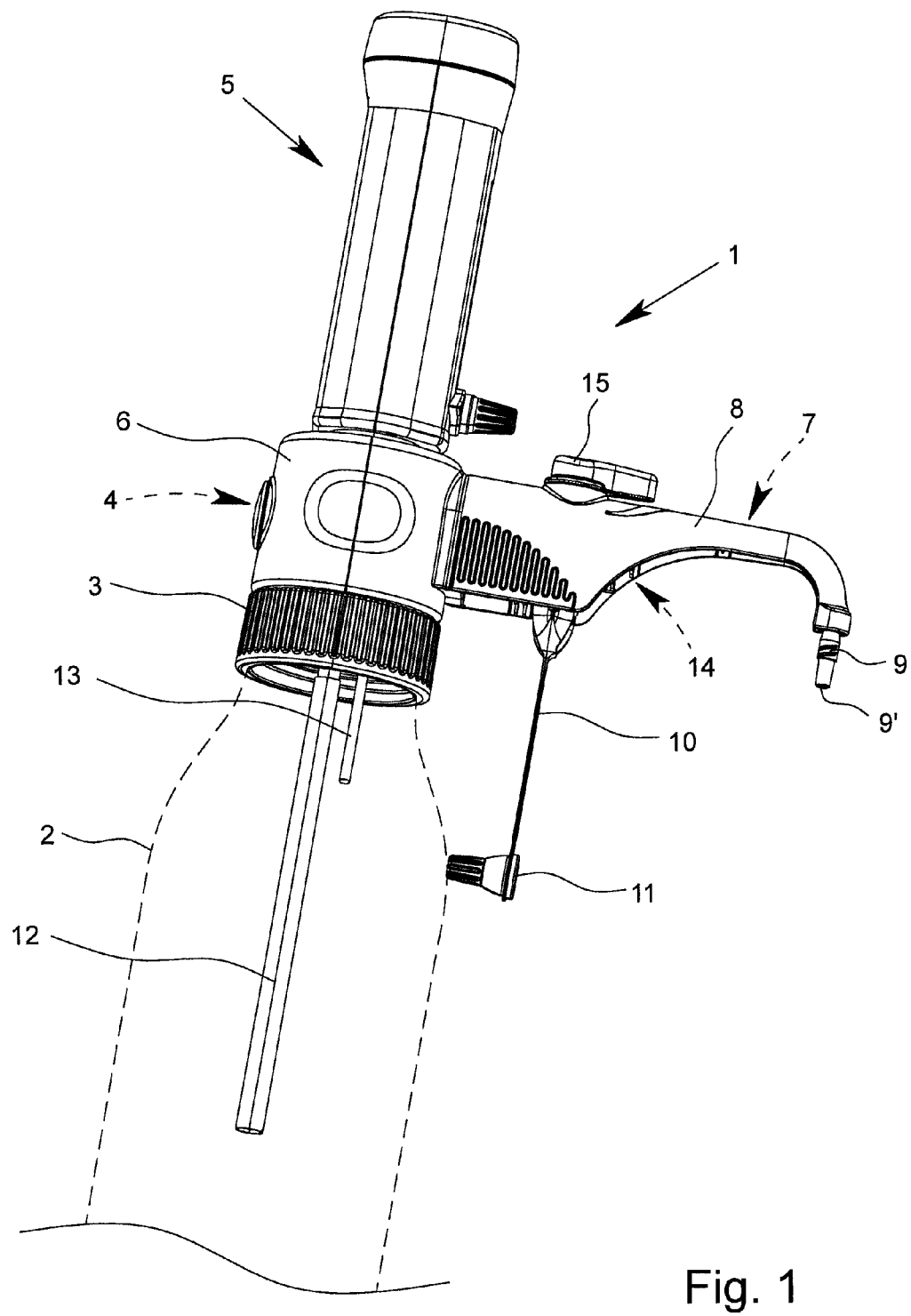
FIG. 1 shows a bottle attachment apparatus for handling liquids, in the form of a bottle top dispenser, in a perspective view.
Figure 2:
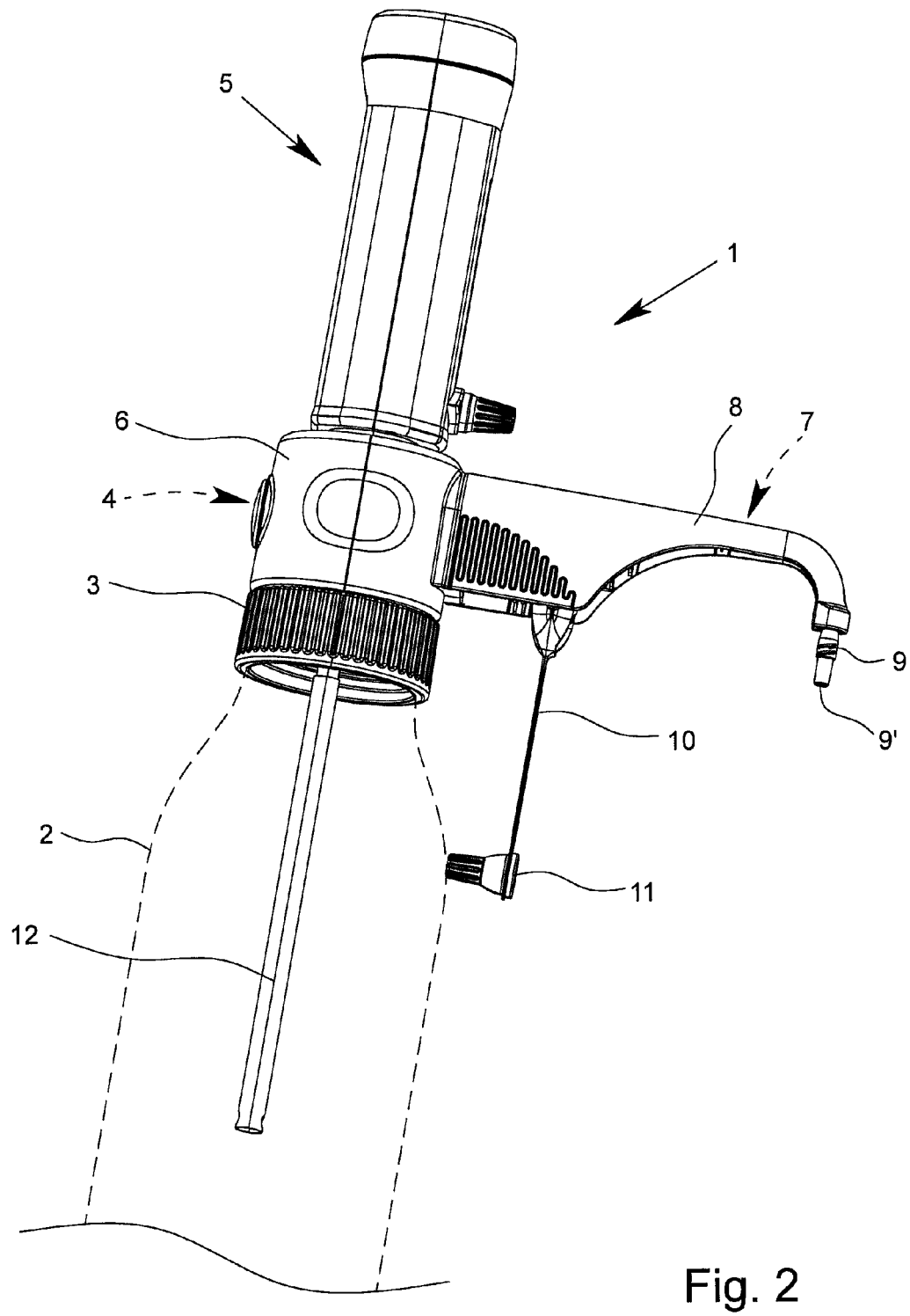
FIG. 2 shows the bottle attachment apparatus from FIG. 1, but without a switching valve in the exhaust line, in a perspective view.

FIGS. 1 and 2 show in each case a preferred exemplary embodiment of a bottle attachment apparatus 1 according to the invention for handling liquids, herein in the form of a bottle top dispenser.

In general terms, in respect of bottle attachment apparatuses for handling liquids, i.e. so-called "liquid handling" apparatuses, reference may be made to the general catalog of the applicant (BRAND general catalog 900 [June 2013]). Bottle attachment apparatuses of the type being discussed are comprehensively explained therein in terms of construction and application. Moreover, in respect of bottle attachment apparatuses of the type being discussed, reference may also be made to the sources of the prior art, as stated at the outset.

The definitions pertaining to top and bottom, and to front and rear, which have been stated at the outset of the description, apply to the bottle attachment apparatus which is described here in the preferred exemplary embodiment. The bottle attachment apparatus 1 will always be discussed in the position which is illustrated in FIG. 1, so as to be on a storage bottle 2 as a preferred example of a storage container, even when said bottle attachment apparatus is not shown in this position in the individual illustrations.

During operation, the bottle attachment apparatus 1 which is illustrated in FIGS. 1 and 2 is attached to a storage bottle 2. More specifically, the bottle attachment apparatus 1 with the aid of a fastening assembly 3 is attached to the bottleneck of the storage bottle 2. If the bottleneck of the storage bottle 2 has an external thread, the fastening assembly 3 may be a type of annular cap having an internal thread, said annular cap being attached at the bottom of the bottle attachment apparatus 1. However, the fastening assembly 3 may also be configured in the form of a stopper-like plug assembly, or assume other shapes. It is only essential that the bottle attachment apparatus 1 by means of the fastening assembly 3 may be securely fastened to the storage bottle 2 or to any other matching storage container.

The cylinder-and-piston assembly 5 of the bottle attachment apparatus 1 can be seen at the top of FIGS. 1 and 2. The bottle attachment apparatus 1 presently has a cylinder-and-piston assembly 5 having an external cylinder housing which encompasses the cylinder. A mechanical and adjustable stroke length stop is located thereon.

A valve block assembly 4 supports the cylinder-and-piston assembly 5, but the former as such according to the preferred teaching here is located in an external housing 6 of the bottle attachment apparatus 1, that is to say that said valve block assembly 4 is not directly identifiable in FIG. 1. The fastening assembly 3 as such is located on the valve block assembly 4 or, as is the case here, on the external housing 6.

An exhaust line 7 forwardly protrudes from the external housing 6 of the bottle attachment apparatus 1, said exhaust line 7 in the illustrated exemplary embodiment being disposed and guided in a cantilever-type mount 8 which is of angular design. The exhaust line 7 terminates at a tip 9. A mounting lug 10 which holds a closure cap 11, by way of which the mouth opening 9' on the tip 9 may be closed off and protected against dripping liquid, is fastened to the mount 8.

An intake line 12 for liquid extends downward from the valve block assembly 4, which is hidden in the external housing 6, into the storage bottle 2. Besides the intake line 12, a return flow line 13 through which liquid may be directed back into the storage bottle 2 instead of through the exhaust line 7, if required, can be seen in FIG. 1.

A switching valve 14 which is suitable for returning the flow of liquid into the storage bottle 2 and which is actuatable by means of a toggle 15 on the upper side of the mount 8, here is located outside the valve block assembly 4 and outside the external housing 6, and in the preferred exemplary embodiment illustrated in FIG. 1 is located within the mount 8 for the exhaust line 7.

FIG. 2 shows a bottle attachment apparatus 1 in the form of a bottle top dispenser without a switching valve 14, that is to say without the "return dosing" function, which is explained in detail in the prior art (European Patent Application EP 0 542 241 A2). In this case, the return flow line 13 is of course also missing.

Figure 3:
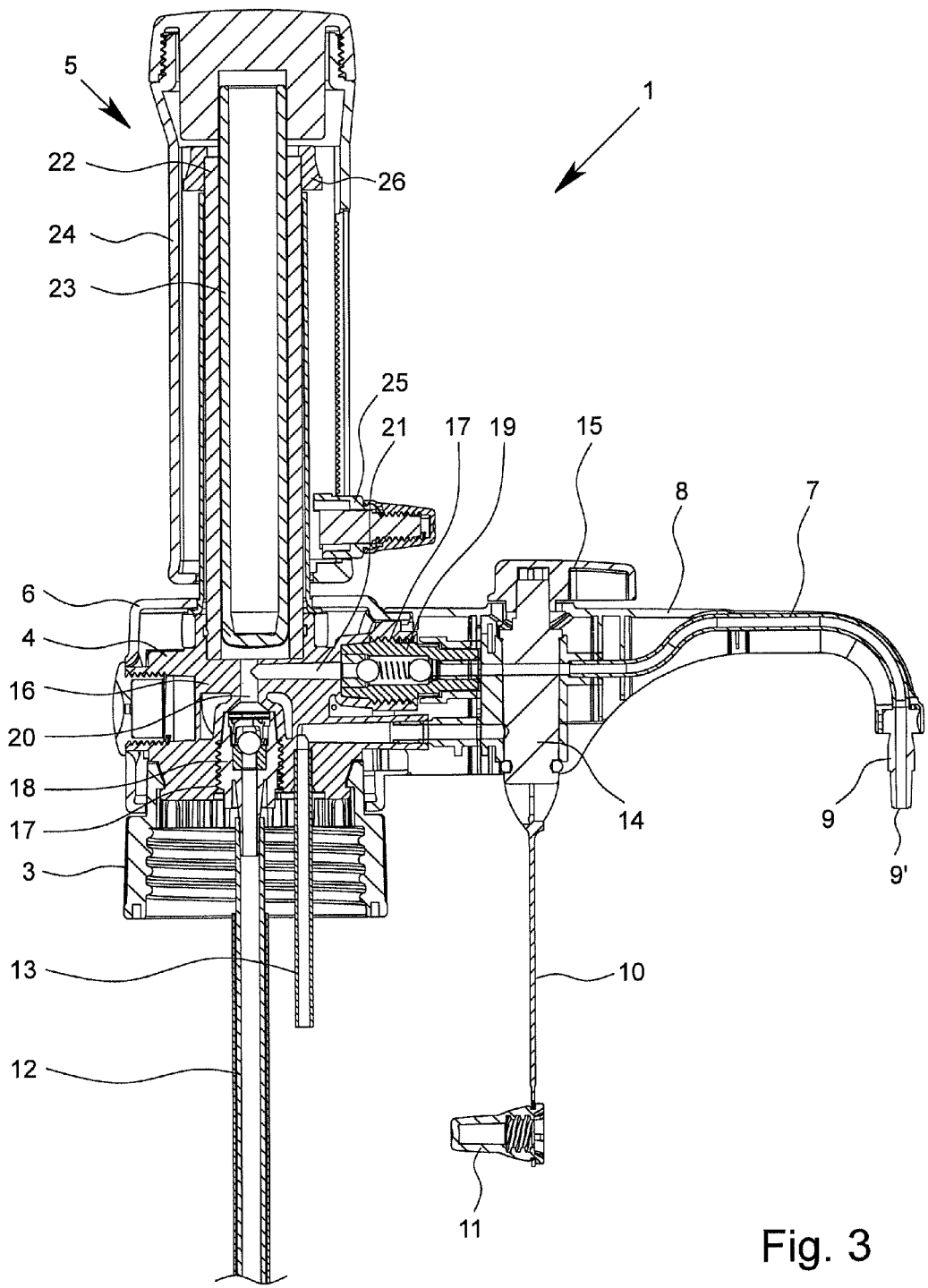
FIG. 3 shows the bottle attachment apparatus from FIG. 1 in a section in the region of the valve block assembly.

FIG. 3 shows the bottle attachment apparatus 1 from FIG. 1 in a sectional view. Here, the valve block assembly 4 can be seen in the external housing 6. The valve block assembly 4 is typically composed of plastics, in particular of plastics resistant to chemicals. The valve block assembly 4 has a multiplicity of ducts and installed elements, for which reference in detail may be made to the prior art which has been discussed at the outset.

The valve block assembly 4 presently shows a valve block 16, an intake valve insert 18, and an exhaust valve insert 19, and in the valve block 16 in each case one valve receptacle 17 which is assigned to the valve insert 18, 19.

The intake valve insert 18 is located in the downwardly oriented intake valve receptacle 17 in the valve block 16, the intake line 12 adjoining the former in a downward manner into the storage bottle 2. Toward the top, an intake duct 20, which leads to the cylinder 22 of the cylinder-and-piston assembly 5, adjoins the intake valve receptacle 17 in the valve block 16. An exhaust duct 21 in the valve block 16, which is directed to the right in FIG. 3, branches off from the intake duct 20, said exhaust duct 21 leading into the exhaust valve receptacle 17 in which the exhaust valve insert 19 is located.

In the preferred exemplary embodiment illustrated, the switching valve 14 in the flow direction of the liquid is located behind the exhaust valve insert 19. This may be readily seen in FIG. 3. However, there are also solutions in terms of construction in which the sequence is reversed, that is to say that the switching valve in the flow direction is ahead of the exhaust valve.

Of the cylinder-and-piston assembly 5, the cylinder 22, the piston 23 which is longitudinally displaceable in the former, the cylinder housing 24 which externally surrounds the cylinder 22, and the stroke length stop 25, and the fixed stop 26 are indicated in FIG. 3. The cylinder-and-piston assembly 5 will now be further explained in detail by means of the drawing, see FIGS. 4 to 7.

Figure 4:
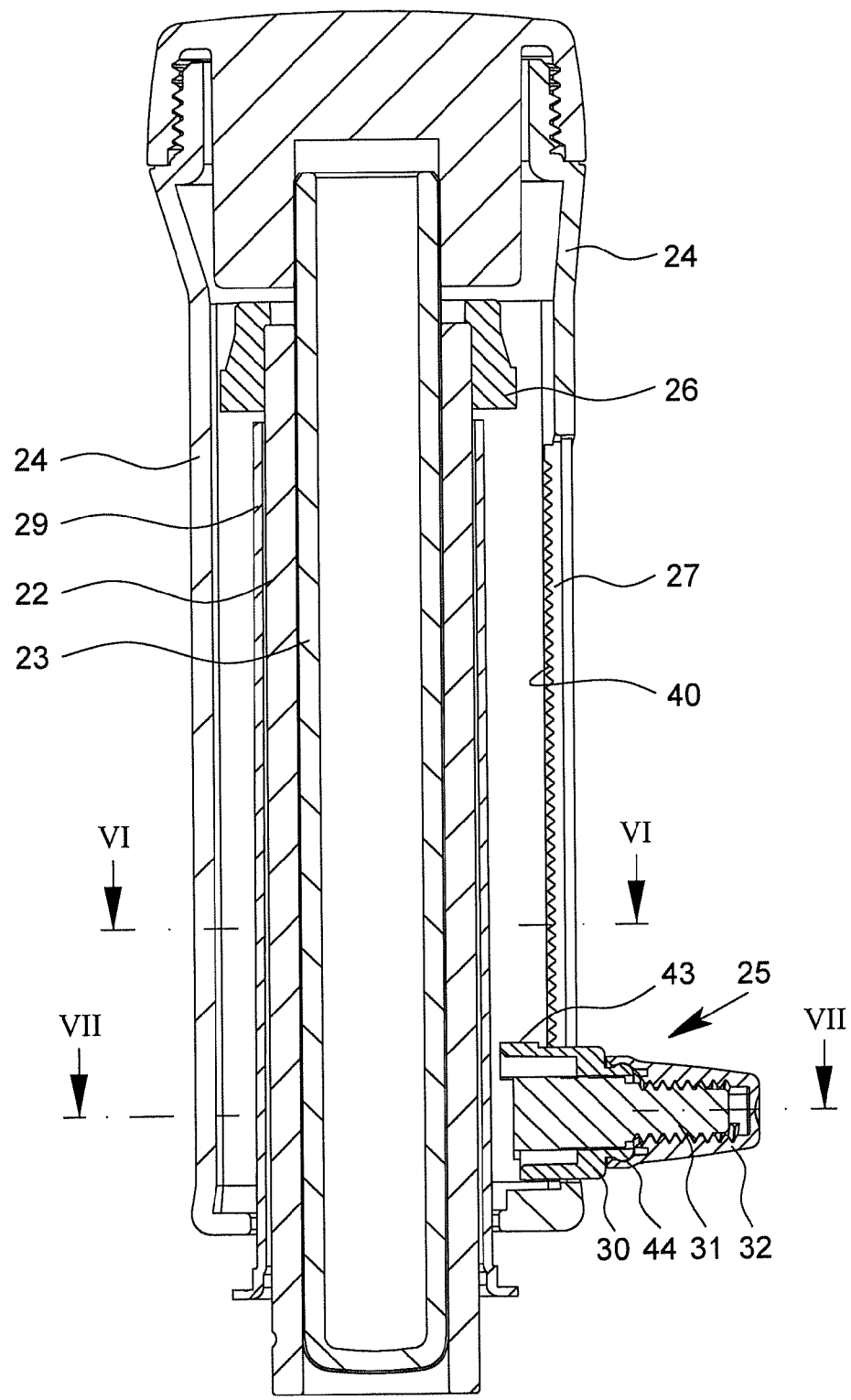
FIG. 4 shows the cylinder-and-piston assembly from FIG. 3 in a selective and much enlarged illustration.
Figure 5:
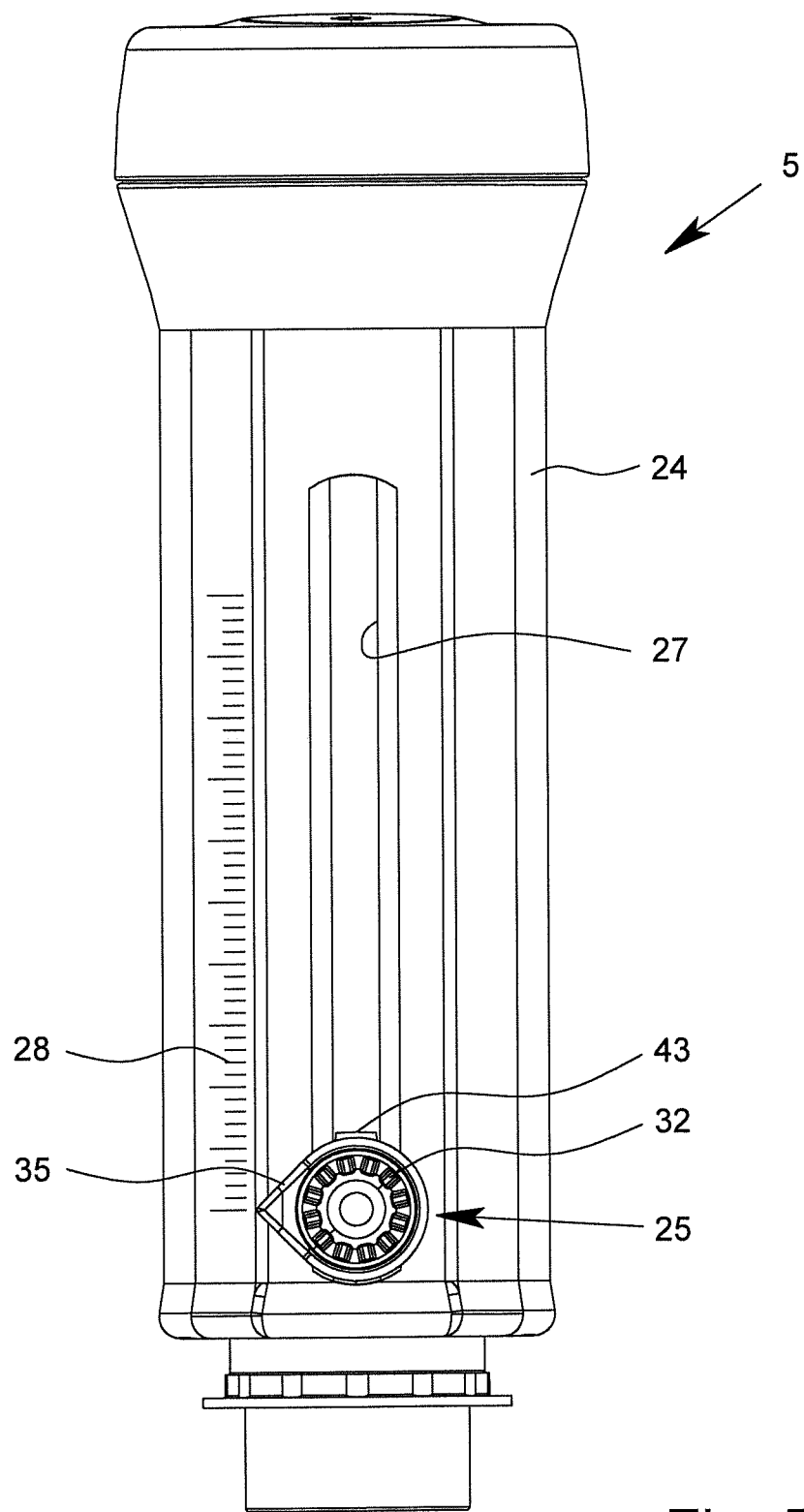
FIG. 5 shows a view from the right in FIG. 4.

FIG. 4 shows an enlarged illustration of the cylinder-and-piston assembly 5 from FIG. 3. FIG. 5 shows a view from the right in FIG. 4.

As can be clearly seen in FIG. 4, the cylinder-and-piston assembly 5 has a cylinder 22 which by way of the central axis thereof defines a longitudinal direction, a piston 23 which is displaceable in a sealed manner in the longitudinal direction in the cylinder 22, and a cylinder housing 24 which is connected to the piston 23 and externally encompasses the cylinder 22 by way of an internal side which faces the cylinder 22 and of an external side which faces away from the cylinder 22. The external side of the cylinder housing 24 may be seen in FIG. 5.

As can be readily seen in the context of FIGS. 4 and 5, the piston 23 is displaceable in the cylinder 22 by displacing the cylinder housing 24 in the cylinder 22. The stroke length of the piston 23 in the cylinder 22 is delimited by a fixed stop 26 which interacts with a stroke length stop 25 on the cylinder housing 24 and which is disposed on the cylinder 22. In the preferred exemplary embodiment illustrated, the fixed stop 26 is disposed in an annular manner at the upper end of the cylinder 22 which here is composed of glass. On account thereof, the fixed stop 26 is independent of the rotational position of the cylinder housing 24 in relation to the cylinder 22.

The cylinder housing 24 has a longitudinal slot 27 running in the longitudinal direction (FIG. 5), and on the external side has a scale 28 assigned to the longitudinal slot 27 (see likewise FIG. 5). The scale 28 is likewise disposed on the left side of the longitudinal slot 27 in FIG. 5. The scale 28 may however also be disposed on the right or on both sides on the longitudinal slot 27 on the cylinder housing 24.

The stroke length stop 25 on the cylinder housing 24 is adjustable in the longitudinal direction and is interlockable in the respective position. FIGS. 4 and 5 show the lowermost position of the stroke length stop 25, and thus the longest stroke length for the cylinder housing 24 having the piston 23.

FIG. 4 furthermore shows a particular embodiment of the cylinder-and-piston assembly 5 in such a manner that the cylinder 22, which presently and according to a preferred teaching is composed of glass, is externally surrounded by a cylindrical splinter shield casing 29.

Figure 6:
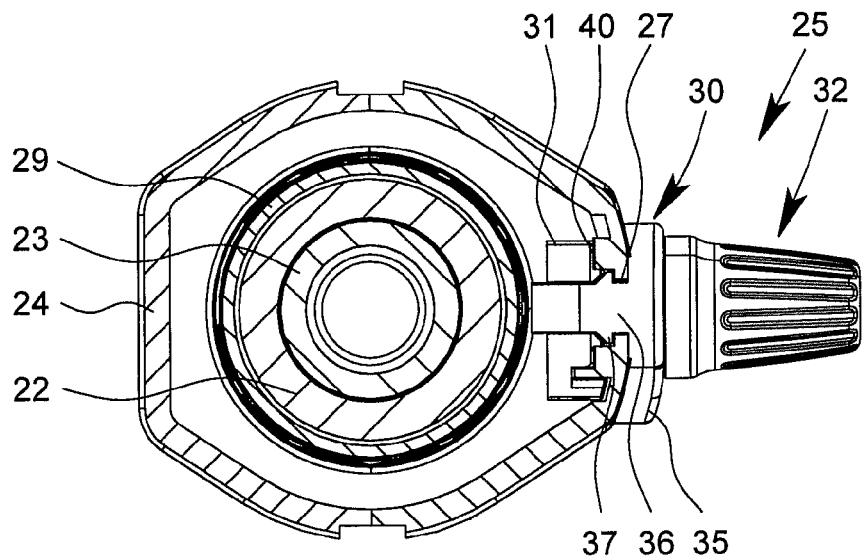
FIG. 6 shows a section through the cylinder-and-piston assembly in FIG. 4, taken along the line VI-VI.
Figure 7:
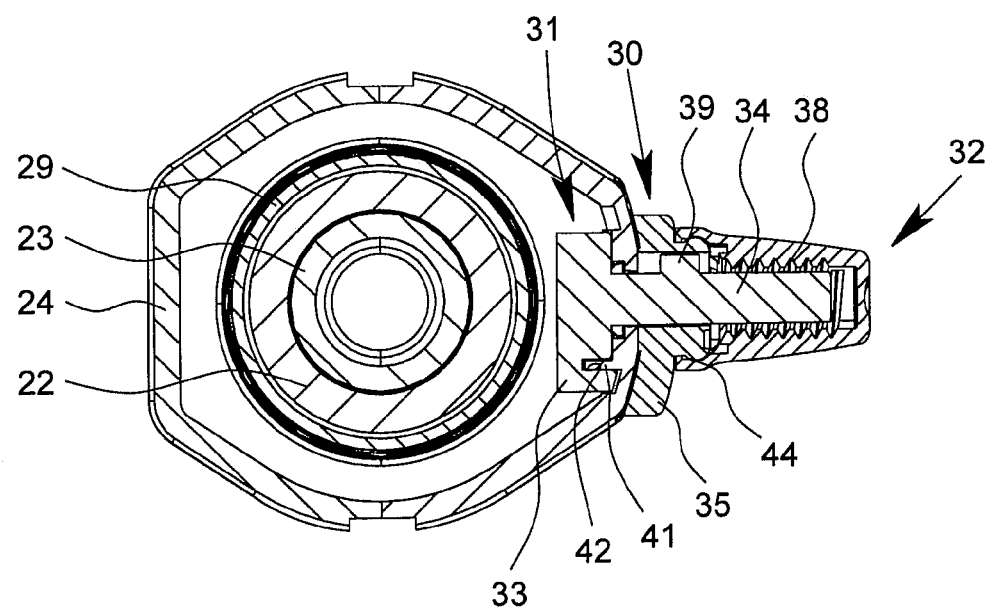
FIG. 7 shows a section through the cylinder-and-piston assembly in FIG. 4, taken along the line VII-VII.

For the further explanations, FIGS. 4, 5, 6, and 7 should be jointly viewed. FIG. 6 shows a section through the cylinder-and-piston assembly 5, above the stroke length stop 5, and thus a plan view from above onto the stroke length stop 25. FIG. 7 shows a section therebelow, which runs through the stroke length stop 25.

The stroke length stop 25 initially shows an indicator element 30 which for indicating a specific value on the scale interacts which the scale 28. The indicator element 30 in the illustrated exemplary embodiment is a slightly curved plate which is preferably composed of plastics and which preferably bears in a congruent manner on the external side of the cylinder housing 24.

The stroke length stop 25 furthermore has an interlocking mount 31 which takes care of the mounting on the cylinder housing 24, and an interlocking cap 32 by way of which the stroke length stop 25 is interlockable in the respective position.

The interlocking mount 31 is displaceably disposed in the longitudinal slot 27. Said interlocking mount has a counter bearing 33 arranged on the internal side of the cylinder housing 24, which is tensionable in relation to the internal side of the cylinder housing 24, and a threaded bolt 34 which extends from the counter bearing 33 through the longitudinal slot 27 to the external side of the cylinder housing 24.

The indicator element 30 has an indicator support 35 which is disposed on the external side of the cylinder housing 24 and which presently and preferably is embodied in a slightly arcuate shape so as to follow the cylinder housing 24, and an appendage 36 which extends from the indicator support 35 through the longitudinal slot 27 to the internal side of the cylinder housing 24. On the left on the indicator support 35, there is a tip which points in the direction of the adjacent scale 28 and which enables precise setting of the stroke length stop 25 to the desired set value.

A particularity pertaining to the appendage 36 on the indicator element 30 lies in that a locking mechanism 37 which here and preferably extends laterally to the longitudinal slot 27 to the internal side of the cylinder housing 24 is provided on the appendage 36. This prevents extraction of the appendage 36 from the longitudinal slot 27 and thus removal of the indicator element 30 from the cylinder housing 24. This locking mechanism 37 is particularly well visible in FIG. 6.

The interlocking cap 32 is screwed onto the threaded bolt 34 of the interlocking mount 31 by way of a counter thread 38. The mutually engaged threads 34, 38 are particularly well visible in FIGS. 4 and 7.

It can be furthermore seen in FIGS. 4, 6, and 7 that the indicator support 35 of the indicator element 30 is disposed between the interlocking cap 32 and the external side of the cylinder housing 24. The interlocking mount 31 together with the indicator element 30) by tightening the interlocking cap 32 on the interlocking mount 31 are interlocked in the desired position. This is particularly well traceable in the case of the illustrated exemplary embodiment by means of FIGS. 4 and 7.

It is particularly well visible in FIG. 7 that the stroke length stop 25 presently is interlocked on the cylinder housing 24 in the position illustrated there on account thereof, that the interlocking cap 32 by way of the external periphery thereof presses on the indicator support 35 of the indicator element 30, the latter on account thereof being pressed against the external side of the cylinder housing 24. The interlocking cap 32 by way of the counter thread 38 simultaneously pulls the threaded bolt 34 of the interlocking mount 31 to the right in FIG. 7. The counter bearing 33 is tensioned in relation to the internal side of the cylinder housing 24. The indicator element 30 is securely jammed between the interlocking cap 32 and the cylinder housing 24.

It can moreover be seen in the illustrations in FIGS. 6 and 7 that here both the interlocking mount 31, by means of a respective portion of the threaded bolt 34 which at this point has no thread, as well as the indicator element 30, by means of a respective portion on the appendage 36, interact with the peripheries of the longitudinal slot 27 of the cylinder housing 24 such that rotation of these parts in relation to the cylinder housing 24 about a longitudinal axis which runs in the direction of the threaded bolt 34 is not possible. However, displacement in the longitudinal direction of the longitudinal slot 27 is possible once the interlocking cap 32 has been loosened. Fixing of the stroke length stop 25 in relation to the cylinder housing 24 has been implemented to the largest extent in terms of all other degrees of freedom.

The illustrated and preferred embodiment shows (FIG. 6) that the locking mechanism 37 on the indicator element 30 here is embodied as a hook structure. The components in question here are composed of plastics; they thus have certain inherent elasticity. On account of the design of the hooks of the locking mechanism 37, the indicator element 30 in FIG. 6 may be pushed into the longitudinal slot 27 from the right so far until the hooks of the locking mechanism 37 snap into place behind the peripheries of the longitudinal slot 27. The indicator element 30 is thus fixed to the cylinder housing 24. This here is a hook structure which is spring-loaded due to the inherent elasticity of the material.

FIG. 7 also shows a particularity of the present construction, which when implemented offers a further advantage. By way of this particularity, inadvertent friction of the counter bearing 33 of the interlocking mount 31 on the cylinder 22 or on the splinter guard housing 29, respectively, is avoided. It is indeed provided that the interlocking mount 31 on the threaded bolt 34 on the external side of the cylinder housing 24 has a return stop 39 which delimits reverse displacement of the threaded bolt 34 in the direction of the internal side of the cylinder housing 24. The return stop 39 which is molded on the threaded bolt 34 so as to radially project therefrom is well visible in FIG. 7. Said return stop 39 may also be embodied as a latching hook structure.

As can be particularly readily seen in FIG. 7, the cylinder-and-piston assembly 5 according to the invention already functions by way of a friction engagement assembly between the internal side of the cylinder housing 24 and the counter bearing 33 of the interlocking mount 31. However, the illustrated and preferred exemplary embodiment, presently in particular FIG. 4, shows that presently and according to a preferred teaching a tooth assembly 40 is provided. A row of teeth of the tooth assembly 40 can be seen in FIG. 4. A corresponding but short row of teeth is to be found on that side of the counter bearing 33 of the interlocking mount 31 that in FIG. 7 is oriented to the right.

FIG. 7 shows the return stop 39, so as to be spaced apart from the external side of the cylinder housing 24. The threaded bolt 34 of the interlocking mount 31 may only be displaced so far into the cylinder housing 24 as the clear spacing between the external side of the cylinder housing 24 and the return stop 39 has been predefined. This length corresponds to at least the dimension which is present between the locking mechanism 37 and the cylinder housing 24 as clearance for movement of the indicator element 30 in the longitudinal slot 27. In the case of interlocking by way of a tooth assembly 40, the height across which the counter bearing 33 by way of the row of teeth thereof engages in the row of teeth on the cylinder housing 24 is to be added.

As is well visible in particular in FIG. 7, the illustrated and preferred exemplary embodiment also shows a further preferred embodiment of the construction. The latter is characterized in that an anti-rotation molding 41 which extends in the longitudinal direction is provided on the internal side of the cylinder housing 24, that an anti-rotation receptacle is provided on the interlocking mount 31, and that the anti-rotation receptacle 42 is guided on the anti-rotation molding 41 so as to be displaceable in the longitudinal direction but so as to be rotationally fixed. On account thereof, a second measure as anti-rotation function in relation to the cylinder housing 24 has been implemented.

The construction of the additional anti-rotation function may also be chosen in a kinematically reversed manner, having the anti-rotation molding 41 on the interlocking mount 31, and the anti-rotation receptacle 42 on the internal side of the cylinder housing 24.

A further particularity of the exemplary embodiment illustrated and preferred here may be seen in FIG. 4 in conjunction with FIG. 6. It is indeed provided here that the threaded bolt 34 of the interlocking mount 31 penetrates the indicator support 35 and preferably also the appendage 36 of the indicator element 30, wherein, preferably, the indicator element 30 and the interlocking mount 31 are interconnected so as to be displaceable in relation to one another in the direction of the longitudinal axis of the threaded bolt 34 but so as to be rotationally fixed.

The illustrated exemplary embodiment shows a special and concealed design of the stroke length stop 25 in such a manner that the indicator element 30 on the internal side of the cylinder housing 24 has a stop face 43 which impacts on the fixed stop 26, wherein, preferably, the stop face 43 is of round shape.

A further particularity of the preferred construction according to the invention of this exemplary embodiment may be seen in FIGS. 4 and 7. This construction relates to the fact that, as opposed to what is usual in the prior art, the interlocking cap 32 here is independently connected to the indicator element 30. In detail, it is provided that the interlocking cap 32 is linked to the indicator element 30 by way of a connection 44 which is effective in the direction of the longitudinal axis of the appendage 36 of the indicator element 30, wherein the connection 44 permits rotation of the interlocking cap 32 in relation to the indicator element 30.

In order for the connection 44 to be implemented, FIG. 7 on the indicator support 35 of the indicator element 30 shows a molded annularly encircling convex peripheral structure. That encircling periphery of the interlocking cap 32 that points to the left is latched onto the latter with the aid of an encircling concave recess. The interlocking cap 32 and the indicator element 30 are effectively interlinked by way of the connection 44 in the direction of the longitudinal axis of the threaded bolt 34 of the interlocking mount 31, said longitudinal axis in FIG. 7 running from the left to the right. However, rotation of the interlocking cap 32 in relation to the indicator support 35 of the indicator element 30 is possible in a plane which is transverse to this longitudinal axis in FIG. 7, because the encircling peripheral structure is annular. Here, the periphery of the interlocking cap 32, which is provided with the concave recess, during such rotation, slides on the convex peripheral structure while overcoming respective dynamic friction.

Specifically, the connection illustrated in FIG. 7 is embodied as an annular latching connection. The inherent elasticity of the interlocking cap 32 which is preferably composed of plastics is sufficient for said interlocking cap 32 to be latched onto the peripheral structure, for the connection 44 to be effective. If and when the interlocking cap 32 in FIG. 7 is rotated in the direction in which the stroke length stop 25 is loosened (under normal circumstances thus in a counter-clockwise direction), the connection 44 is releasable when the interlocking cap 32 is unscrewed. Utilizing the inherent elasticity of the periphery of the interlocking cap 32, this periphery slips off the annular peripheral structure as soon as the return stop 39 impacts on the threaded bolt 34 of the interlocking mount 31 on the external side of the cylinder housing 24 and stops further inward movement of the interlocking mount 31 through the longitudinal slot 27. Further unscrewing of the interlocking cap 32 then no longer displaces the interlocking mount 31 but forces the release of the interlocking cap 32 to the right of the indicator support 35 of the indicator element 30 in FIG. 7.

It is self evident that this connection 44 according to the invention may be designed such that the required torque to be applied to the interlocking cap 32 for releasing the connection 44 between the interlocking cap 32 and the indicator element 30 is higher than the torque usually required for rotating the interlocking cap 32. On account thereof, an operator will immediately perceive that the normal loosening process of the stroke length stop 25 has been terminated. If the operator wishes the matter to rest, this will be a signal to refrain from further unscrewing movements on the interlocking cap 32. Reaching this increased resistance to rotation of the interlocking cap 32 however is also a signal to the operator that the rows of teeth of the tooth assembly 40 are now securely disengaged. The operator thus knows that the stroke length stop 25 may now be freely displaced up and down in relation to the cylinder housing 24 until the desired position in relation to the scale 28 is reached.

The afore-explained design of the locking mechanism 37 and/or of the return stop 39 as a latching hook structure has the advantage that assembly of the stroke length stop 25 is possible without additional fastening means and preferably also without tools.

As is the case in the cylinder-and-piston assembly 5 according to the invention, the inherent elasticity of the plastics usually used here is expediently utilized in order to implement advantageous functions.

The thread pitch of the counter thread 38 of the interlocking cap 32, which runs on the threaded bolt 34, is expediently chosen such that self-locking is provided, on the one hand, and on account thereof automatic loosening of the thread connection is avoided, but that the rotation angle of the interlocking cap 32 for effectively loosening the stroke length stop 25, that is to say for the required adjustment path of the thread bolt 34 of the interlocking mount 31, may be performed by one continuous thumb-and-finger operation, on the other hand.

The additional construction having the anti-rotation molding 41 and the anti-rotation receptacle 42 in relation to the interlocking mount 31 is awarded particular relevance in conjunction with the tooth assembly 40. The position of the rows of teeth is guaranteed in a secure and particularly efficient manner in this way, so that the rows of teeth of the tooth assembly 40 are made to engage in any circumstances. A situation in which a tooth meets with another tooth in the tooth assembly 40 is rendered improbable on account of the teeth of the rows of teeth being held in a secure and parallel manner.

The interlocking cap 32 preferably has a slightly conical external face having gripping grooves which facilitate rotation of the interlocking cap 32. In particular, the gripping grooves are designed such that the practically required torque may be reliably applied with the aid of the interlocking cap 32, but that interlocking cap 32 may not be screwed onto the threaded bolt 34 of the interlocking mount 31 in an unintentionally excessively tight manner.

With reference to the tooth assembly 40, on the one hand, and to the scale 28, on the other hand, it is recommended that the tooth pitch corresponds to the graduation of the scale.

Multiple longitudinal guiding of the indicator element 30, on the one hand, and of the interlocking mount 31, on the other hand, so as to be parallel with the longitudinal slot 27 is particularly expedient. This as far as possible avoids setting errors and reading errors caused by a parallax effect.

It is derived from the entire illustration in the above explanations that the teaching of the invention relates not only to a cylinder-and-piston assembly 5 for a bottle attachment apparatus 1 as a replacement part, but that the teaching of the invention very particularly also relates to a bottle attachment apparatus 1 in which a cylinder-and-piston assembly 5 according to the invention is employed. To this extent, reference may be made to the preceding explanations.

This description uses examples to disclose the invention including the best mode enabling any person skilled in the art to make and use the invention. The patentable scope of the invention, however, is defined by the claims, and may include other examples that occur to those skilled in the art. Such other examples are intended to be within the scope of the claims if they have structural elements that do not differ from the literal language of the claims, or if they include structural elements equivalent to the structural elements covered by the literal language of the claims.

What is claimed is:

1. A cylinder-and-piston assembly for a bottle attachment apparatus for handling liquids, comprising:
   a cylinder-and-piston assembly for suctioning and exhausting liquid,
   a valve block assembly, and
   a fastening assembly for fastening the valve block assembly on a storage bottle,
   wherein the cylinder-and-piston assembly has a cylinder which is attachable to the valve block assembly, a central axis that defines a longitudinal direction, a piston which is displaceable in the cylinder in a sealed manner in the longitudinal direction, and a cylinder housing which is connected to the piston and externally encompasses the cylinder by way of an internal side which faces the cylinder and of an external side which faces away from the cylinder,
   wherein the piston is displaceable in the cylinder by displacing the cylinder housing, and wherein a stroke length of the piston in the cylinder is delimited by a fixed stop which interacts with a stroke length stop on the cylinder housing and is disposed on the cylinder,
   wherein the cylinder housing has a longitudinal slot running in the longitudinal direction, and on the external side has a scale assigned to the longitudinal slot,
   wherein the stroke length stop on the cylinder housing is adjustable in the longitudinal direction and is interlockable in the respective position,
   wherein the stroke length stop has an indicator element which for indicating a specific value on the scale interacts with the scale, an interlocking mount, and an interlocking cap,
   wherein the interlocking mount is displaceably disposed in the longitudinal slot and has a counter bearing arranged on the internal side of the cylinder housing, which is tensionable in relation to the internal side of the cylinder housing, and a threaded bolt which extends from the counter bearing through the longitudinal slot to the external side of the cylinder housing,
wherein the indicator element has an indicator support which is disposed on the external side of the cylinder housing, an appendage which extends from the indicator support through the longitudinal slot to the internal side of the cylinder housing, and a locking mechanism which is disposed on the appendage and which prevents extraction of the appendage from the longitudinal slot,
   wherein at least one of the interlocking mount and the indicator element is guided on the cylinder housing so as to be displaceable in the longitudinal direction, but so as to be rotationally fixed,
   wherein the interlocking cap is screwed onto the threaded bolt of the interlocking mount by way of a counter thread,
   wherein the indicator support of the indicator element is disposed between the interlocking cap and the external side of the cylinder housing, and
   wherein the interlocking mount and the indicator element are interlockable in a desired position on the cylinder housing by tightening the interlocking cap on the interlocking mount.

2. The cylinder-and-piston assembly as claimed in claim 1, wherein the appendage together with the peripheries of the longitudinal slot form a guide for displacement in the longitudinal slot.

3. The cylinder-and-piston assembly as claimed in claim 1, wherein the locking mechanism on the indicator element has a hook structure.

4. The cylinder-and-piston assembly as claimed in claim 1, wherein one of a friction-engagement assembly and a tooth assembly is disposed on the internal side of the cylinder housing, between the counter bearing of the interlocking mount, on the one hand, and the internal side of the cylinder housing, on the other hand.

5. The cylinder-and-piston assembly as claimed in claim 1, wherein an anti-rotation molding is provided on the interlocking mount, and an anti-rotation receptacle which extends in the longitudinal direction and in which the anti-rotation molding is guided so as to be displaceable in the longitudinal direction but so as to be rotationally fixed, is provided on the internal side of the cylinder housing.

6. The cylinder-and-piston assembly as claimed in claim 1, wherein an anti-rotation molding which extends in the longitudinal direction is provided on the internal side of the cylinder housing, an anti-rotation receptacle is provided on the interlocking mount, and the anti-rotation receptacle is guided on the anti-rotation molding so as to be displaceable in the longitudinal direction but so as to be rotationally fixed.

7. The cylinder-and-piston assembly as claimed in claim 1, wherein the threaded bolt of the interlocking mount penetrates the indicator support and also the appendage of the indicator element.

8. The cylinder-and-piston assembly as claimed in claim 7, wherein the indicator element and the interlocking mount are interconnected so as to be displaceable in relation to one another in the direction of the longitudinal axis of the threaded bolt but so as to be rotationally fixed.

9. The cylinder-and-piston assembly as claimed claim 1, wherein the indicator element on the internal side of the cylinder housing has a stop face which impacts on the fixed stop.

10. A cylinder-and-piston assembly for a bottle attachment apparatus for handling liquids, comprising:
   a cylinder-and-piston assembly for suctioning and exhausting liquid,
   a valve block assembly, and
   a fastening assembly for fastening the valve block assembly on a storage bottle,
   wherein the cylinder-and-piston assembly has a cylinder which is attachable to the valve block assembly, a central axis that defines a longitudinal direction, a piston which is displaceable in the cylinder in a sealed manner in the longitudinal direction, and a cylinder housing which is connected to the piston and externally encompasses the cylinder by way of an internal side which faces the cylinder and of an external side which faces away from the cylinder,
   wherein the piston is displaceable in the cylinder by displacing the cylinder housing,
   wherein a stroke length of the piston in the cylinder is delimited by a fixed stop which interacts with a stroke length stop on the cylinder housing and is disposed on the cylinder,
   wherein the cylinder housing has a longitudinal slot running in the longitudinal direction, and on the external side has a scale assigned to the longitudinal slot,
   wherein the stroke length stop on the cylinder housing is adjustable in the longitudinal direction and is interlockable in the respective position, wherein the stroke length stop has an indicator element which for indicating a specific value on the scale interacts with the scale, an interlocking mount, and an interlocking cap, wherein the interlocking mount is displaceably disposed in the longitudinal slot and has a counter bearing arranged on the internal side of the cylinder housing, which is tensionable in relation to the internal side of the cylinder housing, and a threaded bolt which extends from the counter bearing through the longitudinal slot to the external side of the cylinder housing, wherein at least one of the interlocking mount and the indicator element is guided on the cylinder housing so as to be displaceable in the longitudinal direction but so as to be rotationally fixed, wherein the interlocking cap is screwed onto the threaded bolt of the interlocking mount by way of a counter thread, wherein the indicator support of the indicator element is disposed between the interlocking cap and the external side of the cylinder housing, wherein the interlocking mount and the indicator element are interlockable in a desired position on the cylinder housing by tightening the interlocking cap on the interlocking mount, and wherein the interlocking mount on the external side of the cylinder housing has a return stop which delimits reverse displacement of the counter bearing in the direction of the internal side of the cylinder housing.

11. The cylinder-and-piston assembly as claimed in claim 10, wherein the stroke length stop has an indicator element which for indicating a specific value on the scale interacts with the scale, an interlocking mount, and an interlocking cap, wherein the interlocking mount is displaceably disposed in the longitudinal slot and has a counter bearing arranged on the internal side of the cylinder housing, which is tensionable in relation to the internal side of the cylinder housing, and a threaded bolt which extends from the counter bearing through the longitudinal slot to the external side of the cylinder housing, wherein the indicator element has an indicator support which is disposed on the external side of the cylinder housing, an appendage which extends from the indicator support through the longitudinal slot to the internal side of the cylinder housing, and a locking mechanism which is disposed on the appendage and which prevents extraction of the appendage from the longitudinal slot, wherein at least one of the interlocking mount and the indicator element is guided on the cylinder housing so as to be displaceable in the longitudinal direction but so as to be rotationally fixed, wherein the interlocking cap is screwed onto the threaded bolt of the interlocking mount by way of a counter thread, wherein the indicator support of the indicator element is disposed between the interlocking cap and the external side of the cylinder housing, wherein the interlocking mount and the indicator element by tightening the interlocking cap on the interlocking mount are interlockable in a desired position on the cylinder housing, and wherein a clear spacing is provided between the external side of the cylinder housing and the return stop that corresponds to at least a dimension which is present between the locking mechanism and the cylinder housing as a clearance for movement of the indicator element in the longitudinal slot, plus the height of a potentially present tooth assembly.

12. A cylinder-and-piston assembly for a bottle attachment apparatus for handling liquids, comprising:
a cylinder-and-piston assembly for suctioning and exhausting liquid,
a valve block assembly, and
a fastening assembly for fastening the valve block assembly on a storage bottle, wherein the cylinder-and-piston assembly has a cylinder which is attachable to the valve block assembly, a central axis that defines a longitudinal direction, a piston which is displaceable in a sealed manner in the longitudinal direction in the cylinder, and a cylinder housing which is connected to the piston and externally encompasses the cylinder by way of an internal side which faces the cylinder and of an external side which faces away from the cylinder, wherein the piston is displaceable in the cylinder by displacing the cylinder housing, and wherein a stroke length of the piston in the cylinder is delimited by a fixed stop which interacts with a stroke length stop on the cylinder housing and is disposed on the cylinder, wherein the cylinder housing has a longitudinal slot running in the longitudinal direction, and on the external side has a scale assigned to the longitudinal slot, wherein the stroke length stop on the cylinder housing is adjustable in the longitudinal direction and is interlockable in the respective position, wherein the stroke length stop has an indicator element which for indicating a specific value on the scale interacts with the scale, an interlocking mount, and an interlocking cap, wherein the interlocking mount is displaceably disposed in the longitudinal slot and has a counter bearing arranged on the internal side of the cylinder housing, which is tensionable in relation to the internal side of the cylinder housing, and a threaded bolt which extends from the counter bearing through the longitudinal slot to the external side of the cylinder housing, wherein at least one of the interlocking mount and the indicator element is guided on the cylinder housing so as to be displaceable in the longitudinal direction, but so as to be rotationally fixed, wherein the interlocking cap is screwed onto the threaded bolt of the interlocking mount by way of a counter thread, wherein the indicator support of the indicator element is disposed between the interlocking cap and the external side of the cylinder housing, wherein the interlocking mount and the indicator element are interlockable in a desired position on the cylinder housing, and wherein the interlocking cap is linked to the indicator element by way of a connection which is effective in the direction of the longitudinal axis of the appendage of the indicator element, wherein the connection permits rotation of the interlocking cap in relation to the indicator element.

13. The cylinder-and-piston assembly as claimed in claim 12, wherein the connection comprises an annular latching connection.

14. The cylinder-and-piston assembly as claimed in claim 13, wherein for establishing the connection, the interlocking cap encompasses the indicator element in a linking manner on a convex peripheral structure.

15. The cylinder-and-piston assembly as claimed in claim 13, wherein the connection is releasable when the interlocking cap is unscrewed.

16. The cylinder-and-piston assembly as claimed in claim 15, wherein a required torque to be applied to the interlocking cap for releasing the connection between the interlocking cap and the indicator element is higher than the torque otherwise required for rotating the interlocking cap in relation to the indicator element.

17. A bottle attachment apparatus for handling liquids, comprising:
   a cylinder-and-piston assembly for suctioning and exhausting liquid,
   a valve block assembly, and
   a fastening assembly for fastening the valve block assembly on a storage bottle,
   wherein the cylinder-and-piston assembly has a cylinder which is attachable to the valve block assembly, a central axis that defines a longitudinal direction, a piston which is displaceable in a sealed manner in the longitudinal direction in the cylinder, and a cylinder housing which is connected to the piston and externally encompasses the cylinder by way of an internal side which faces the cylinder and of an external side which faces away from the cylinder,
   wherein the piston is displaceable in the cylinder by displacing the cylinder housing,
   wherein a stroke length of the piston in the cylinder is delimited by a fixed stop which interacts with a stroke length stop on the cylinder housing and is disposed on the cylinder,
   wherein the cylinder housing has a longitudinal slot running in the longitudinal direction, and on the external side has a scale assigned to the longitudinal slot,
   wherein the stroke length stop on the cylinder housing is adjustable in the longitudinal direction and is interlockable in the respective position,
   wherein the stroke length stop has an indicator element which interacts with the scale for indicating a specific value on the scale, an interlocking mount, and an interlocking cap,
   wherein the interlocking mount is displaceably disposed in the longitudinal slot and has a counter bearing arranged on the internal side of the cylinder housing, which is tensionable in relation to the internal side of the cylinder housing, and a threaded bolt which extends from the counter bearing through the longitudinal slot to the external side of the cylinder housing,
   wherein the indicator element has an indicator support which is disposed on the external side of the cylinder housing, an appendage which extends from the indicator support through the longitudinal slot to the internal side of the cylinder housing, and a locking mechanism which is disposed on the appendage and which prevents extraction of the appendage from the longitudinal slot,
   wherein at least one of the interlocking mount and the indicator element is guided on the cylinder housing so as to be displaceable in the longitudinal direction but so as to be rotationally fixed,
   wherein the interlocking cap is screwed onto the threaded bolt of the interlocking mount by way of a counter thread,
   wherein the indicator support of the indicator element is disposed between the interlocking cap and the external side of the cylinder housing, and
   wherein the interlocking mount and the indicator element are interlockable in a desired position on the cylinder housing by tightening the interlocking cap on the interlocking mount.

18. The bottle attachment apparatus as claimed in claim 17, wherein the interlocking mount on the external side of the cylinder housing has a return stop which delimits reverse displacement of the counter bearing in the direction of the internal side of the cylinder housing.

19. The bottle attachment apparatus as claimed in claim 18, wherein the interlocking cap is linked to the indicator element by way of a connection which is effective in the direction of the longitudinal axis of the appendage of the indicator element, wherein the connection permits rotation of the interlocking cap in relation to the indicator element.

20. A bottle attachment apparatus for handling liquids, comprising:
   a cylinder-and-piston assembly for suctioning and exhausting liquid,
   a valve block assembly, and
   a fastening assembly for fastening the valve block assembly on a storage bottle,
   wherein the cylinder-and-piston assembly has a cylinder which is attachable to the valve block assembly, a central axis that defines a longitudinal direction, a piston which is displaceable in a sealed manner in the longitudinal direction in the cylinder, and a cylinder housing which is connected to the piston and externally encompasses the cylinder by way of an internal side which faces the cylinder and of an external side which faces away from the cylinder,
   wherein the piston is displaceable in the cylinder by displacing the cylinder housing, and wherein the stroke length of the piston in the cylinder is delimited by a fixed stop which interacts with a stroke length stop on the cylinder housing and is disposed on the cylinder,
   wherein the cylinder housing has a longitudinal slot running in the longitudinal direction, and on the external side has a scale assigned to the longitudinal slot,
   wherein the stroke length stop on the cylinder housing is adjustable in the longitudinal direction and is interlockable in the respective position,
   wherein the stroke length stop has an indicator element which for indicating a specific value on the scale interacts with the scale, an interlocking mount, and an interlocking cap,
   wherein the interlocking mount is displaceably disposed in the longitudinal slot and has a counter bearing arranged on the internal side of the cylinder housing which is tensionable in relation to the internal side of the cylinder housing, and a threaded bolt which extends from the counter bearing through the longitudinal slot to the external side of the cylinder housing,
   wherein at least one of the interlocking mount and the indicator element is guided on the cylinder housing so as to be displaceable in the longitudinal direction, but so as to be rotationally fixed,
   wherein the interlocking cap is screwed onto the threaded bolt of the interlocking mount by way of a counter thread,
   wherein the indicator support of the indicator element is disposed between the interlocking cap and the external side of the cylinder housing,
   wherein the interlocking mount and the indicator element are interlockable in a desired position on the cylinder housing by tightening the interlocking cap on the interlocking mount, and
   wherein the interlocking mount on the external side of the cylinder housing has a return stop which delimits reverse displacement of the counter bearing in the direction of the internal side of the cylinder housing.

21. A bottle attachment apparatus for handling liquids, comprising:

a cylinder-and-piston assembly for suctioning and exhausting liquid,
a valve block assembly, and
a fastening assembly for fastening the valve block assembly on a storage bottle,
wherein the cylinder-and-piston assembly has a cylinder which is attachable to the valve block assembly, a central axis that defines a longitudinal direction, a piston which is displaceable in a sealed manner in the longitudinal direction in the cylinder, and a cylinder housing which is connected to the piston and externally encompasses the cylinder by way of an internal side which faces the cylinder and of an external side which faces away from the cylinder,
wherein the piston is displaceable in the cylinder by displacing the cylinder housing,
wherein a stroke length of the piston in the cylinder is delimited by a fixed stop which interacts with a stroke length stop on the cylinder housing and is disposed on the cylinder,
wherein the cylinder housing has a longitudinal slot running in the longitudinal direction, and on the external side has a scale assigned to the longitudinal slot,
wherein the stroke length stop on the cylinder housing is adjustable in the longitudinal direction and is interlockable in the respective position,
wherein the stroke length stop has an indicator element which interacts with the scale for indicating a specific value on the scale, an interlocking mount, and an interlocking cap,
wherein the interlocking mount is displaceably disposed in the longitudinal slot and has a counter bearing arranged on the internal side of the cylinder housing, which is tensionable in relation to the internal side of the cylinder housing, and a threaded bolt which extends from the counter bearing through the longitudinal slot to the external side of the cylinder housing,
wherein at least one of the interlocking mount and the indicator element is guided on the cylinder housing so as to be displaceable in the longitudinal direction but so as to be rotationally fixed,
wherein the interlocking cap is screwed onto the threaded bolt of the interlocking mount by way of a counter thread,
wherein the indicator support of the indicator element is disposed between the interlocking cap and the external side of the cylinder housing,
wherein the interlocking mount and the indicator element are interlockable in a desired position on the cylinder housing by tightening the interlocking cap on the interlocking mount, and
wherein the interlocking cap is linked to the indicator element by way of a connection which is effective in the direction of the longitudinal axis of the appendage of the indicator element, the connection permitting rotation of the interlocking cap in relation to the indicator element.

\* \* \* \* \*